(12) United States Patent
Wada et al.

(10) Patent No.: US 8,982,442 B2
(45) Date of Patent: Mar. 17, 2015

(54) WAVELENGTH SELECTION POLARIZATION CONTROLLER

(75) Inventors: Naoya Wada, Koganei (JP); Seitetsu Boku, Ageo (JP); Hiroyuki Yamazaki, Ageo (JP); Yusaku Tottori, Ageo (JP)

(73) Assignees: National Institute of Information and Communications Technology, Tokyo (JP); Optoquest Co., Ltd., Saitama (JP)

( * ) Notice: Subject to any disclaimer, the term of this patent is extended or adjusted under 35 U.S.C. 154(b) by 0 days.

(21) Appl. No.: 14/126,161

(22) PCT Filed: Jun. 12, 2012

(86) PCT No.: PCT/JP2012/065007
§ 371 (c)(1),
(2), (4) Date: Dec. 13, 2013

(87) PCT Pub. No.: WO2012/173113
PCT Pub. Date: Dec. 20, 2012

(65) Prior Publication Data
US 2014/0133004 A1 May 15, 2014

(51) Int. Cl.
*G02F 1/01* (2006.01)
*G02B 27/00* (2006.01)

(52) U.S. Cl.
CPC .......... *G02F 1/0136* (2013.01); *G02F 2203/58* (2013.01); *G02F 2203/585* (2013.01); *G02B 27/00* (2013.01)
USPC ........................................................ 359/238

(58) Field of Classification Search
USPC .......... 359/238, 251, 279, 303, 304, 563, 566
See application file for complete search history.

(56) References Cited

U.S. PATENT DOCUMENTS

| 6,826,209 | B1 * | 11/2004 | Morita et al. .................... 372/26 |
| 2004/0190822 | A1 | 9/2004 | Yamamoto et al. |
| 2004/0252938 | A1 | 12/2004 | Ducellier et al. |
| 2006/0239607 | A1 | 10/2006 | Yamamoto et al. |
| 2010/0157179 | A1 | 6/2010 | Wada et al. |

FOREIGN PATENT DOCUMENTS

| EP | 0 663 604 | 7/1995 |
| JP | 7-218889 | 8/1995 |
| JP | 08-262394 | 10/1996 |
| JP | 2004-302317 | 10/2004 |
| JP | 2005-526287 | 9/2005 |
| JP | 2008-310190 | 12/2008 |

OTHER PUBLICATIONS

International Search Report, mailed Jul. 17, 2012, for corresponding International Application No. PCT/JP2012/065007.

* cited by examiner

*Primary Examiner* — Tuyen Tra
(74) *Attorney, Agent, or Firm* — Greenblum & Bernstein, P.L.C.

(57) ABSTRACT

A wavelength selective polarization controller capable of controlling the polarization plane of optical wavelength multiplexing signals, for each wavelength component, and which does not generate time lag between each component is provided. This wavelength selective polarization controller has: a telecentric optical system to which optical wavelength multiplexing signals are incident; a polarization controller that controls the polarization plane of light output from the telecentric optical system; and an output optical system for outputting to an optical path output from the polarization controller. The telecentric optical system has: a first diffraction grating to which the optical wavelength multiplexing signals are incident; and a first condenser that condenses the optical wavelength multiplexing signals that have passed through the diffraction grating. The polarization controller has a plurality of phase modulators.

3 Claims, 6 Drawing Sheets

CHROMATIC DISPERSION
DIRECTION

[WAVELENGTH SEPARATION DIRECTION]

Fig. 6 B

[ORTHOGONAL DIRECTION TO WAVELENGTH SEPARATION DIRECTION]

Fig. 7 A

[WAVELENGTH SEPARATION DIRECTION]

Fig. 7 B

[ORTHOGONAL DIRECTION TO WAVELENGTH SEPARATION DIRECTION]

WAVELENGTH SELECTION POLARIZATION CONTROLLER

TECHNICAL FIELD

The present invention relates to a wavelength selective polarization controller that is capable of performing polarization control of optical wavelength multiplexing signals, which are multiplexed in a random polarization state, for each wavelength component without laser separation.

BACKGROUND ART

In wavelength multiplexing optical information communication, a variable band spectrum shaper (VBS) is known as a device that controls the phase and strength of optical wavelength multiplexing signals. For example, a VBS is disclosed in JP 2008-310190 A (Patent Literature 1 described below).

In addition, a multi-input multi-output optical polarization controller is known as a device for performing polarization control for each wavelength component and also for outputting optical signals of a plurality of wavelengths the polarization plane of each of which is controlled. A multi-input multi-output optical polarization controller is disclosed in, for example, JP 8-262394 A (Patent Literature 2 described below). This multi-input multi-output optical polarization controller is capable of controlling the polarization state of each of wavelength components included in the optical wavelength multiplexing signals by separating optical wavelength multiplexing signals depending on the wavelengths and by multiplexing the optical wavelength multiplexing signals after controlling the polarization plane of each of the wavelength components.

CITATION LIST

Patent Literatures

Patent Literature 1: JP 2008-310190 A
Patent Literature 2: JP 8-262394 A

SUMMARY OF INVENTION

Technical Problem

The VBS described above is not capable of controlling polarized light of optical wavelength multiplexing signals.

The multi-input multi-output optical polarization controller causes, when multiplexing a plurality of wavelength components, the timing of each of the components to lag.

Hence, an object of the present invention is to provide a wavelength selective polarization controller that is capable of controlling the polarization plane of each of optical wavelength multiplexing signals for each wavelength component and, on top of that, does not cause time lag in the respective components.

Solution to Problem

The above problems are solved by a wavelength selective polarization controller of the present invention. The wavelength selective polarization controller of the present invention is capable of performing polarization control of optical wavelength multiplexing signals for each wavelength component without laser separation. The wavelength selective polarization controller of the present invention has a diffraction grating and a condenser constituting a telecentric optical system, a polarization controller for controlling the polarization of the respective components that are output from the telecentric optical system and are aligned from one wavelength to another in a single light beam, and an output optical system for outputting the output from the polarization controller to an optical path. The present invention is basically based on such knowledge that, by rendering optical wavelength multiplexing signals to be a light beam having them aligned from one wavelength to another in a single beam in a telecentric optical system and by making polarization control for each component by a polarization controller, the optical wavelength multiplexing signals can be subjected to control of the polarization plane for each wavelength without being separated.

An aspect of the present invention relates to a wavelength selective polarization controller. The wavelength selective polarization controller has a telecentric optical system 11 to which optical wavelength multiplexing signals are incident, a polarization controller 12 that controls a polarization plane of light having been output from the telecentric optical system, and an output optical system 13 for outputting an output from the polarization controller to an optical path.

The telecentric optical system 11 includes a first diffraction grating 15 to which optical wavelength multiplexing signals are incident and a first condenser 16 that condenses the optical wavelength multiplexing signals having passed through the diffraction grating 15. Further, the telecentric optical system 11 transmits the optical wavelength multiplexing signals to the polarization controller 12 in a state of being aligned from one wavelength to another in a single light beam.

A polarization controller 12 has a plurality of phase modulators 21, 22, 23. An example of the plurality of phase modulators 21, 22, 23 is one having a first phase modulator of 0 degree, a second phase modulator of 45 degrees and a third phase modulator of 0 degree in this order. The polarization controller 12 is one that controls polarization planes of optical wavelength multiplexing signals, which are output from a telecentric optical system 11, for each wavelength component.

Another example of the plurality of phase modulators 21, 22, 23 different from the above is one having a first phase modulator of 90 degrees, a second phase modulator of 135 degrees and a third phase modulator of 90 degrees in this order. That is, in the wavelength selective polarization controller described above, the phase modulator of 90 degrees may be used instead of the phase modulator of 0 degree. Likewise, the phase modulator of 135 degrees may be used instead of the phase modulator of 45 degrees.

As an output optical system 13, for example, there are named one having a constitution symmetric to the telecentric optical system 11 and, in the case in which light beams return by being reflected, the telecentric optical system 11 itself. The telecentric optical system 11 has a second condenser 31 to which output light from the polarization controller 12 is incident, and a second diffraction grating 32 to which output light having passed through the second condenser 31 is incident.

Advantageous Effects of Invention

According to the present invention, it is possible to provide a wavelength selective polarization controller that is capable of controlling the polarization plane of each of optical wavelength multiplexing signals for each wavelength component and, on top of that, does not cause time lag in the respective components.

DESCRIPTION OF EMBODIMENTS

Figure 1:
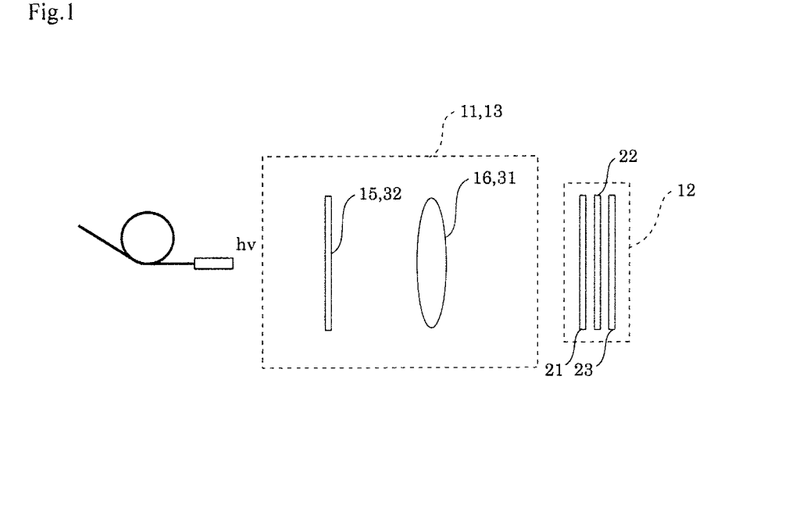
FIG. 1 is a block diagram for explaining a wavelength selective polarization controller of the present invention.

The present invention will be described below. FIG. 1 is a block diagram for explaining a wavelength selective polarization controller of the present invention. As shown in FIG. 1, this wavelength selective polarization controller has a telecentric optical system 11 to which optical wavelength multiplexing signals are incident, a polarization controller 12 that controls the polarization plane of light output from the telecentric optical system, and an output optical system 13 for outputting the output from the polarization controller to an optical path.

The wavelength selective polarization controller is a device that is capable of controlling the polarization plane of each of wavelength components included in the optical wavelength multiplexing signals.

The telecentric optical system 11 has a first diffraction grating 15 to which the optical wavelength multiplexing signals are incident, and a first condenser 16 that condenses the optical wavelength multiplexing signals that have passed through the diffraction grating 15. The telecentric optical system is such an optical system in which an optical axis is regarded to be parallel with the chief axis. The telecentric optical system 11 may further include optical elements including a polarization control device, a polarizer and a reflecting mirror. The diffraction grating may be an array waveguide grating (AWG). An example of the optical wavelength multiplexing signals is one that is output from a single-mode fiber or a polarization maintaining fiber and is input into the telecentric optical system.

The telecentric optical system 11 is one that transmits the optical wavelength multiplexing signals to the polarization controller 12 in a state in which the optical wavelength multiplexing signals are aligned from one wavelength to another in a single light beam. That is, the optical wavelength multiplexing signals are incident to the first diffraction grating 15. Then, the optical wavelength multiplexing signals disperse from one wavelength component to another at the first diffraction grating 15. These dispersed optical wavelength multiplexing signals are condensed by the first condenser 16. Then, it becomes possible to obtain the optical wavelength multiplexing signals that are aligned from one wavelength component to another in a single light beam. The optical wavelength multiplexing signals aligned from one wavelength component to another in a single light beam are output to the polarization controller 12. That is, the first condenser 16 is installed at a location in which it is able to output the optical wavelength multiplexing signals aligned from one wavelength component to another in a single light beam to the polarization controller 12.

The polarization controller 12 has a plurality of phase modulators 21, 22, 23. Each of the plurality of phase modulators 21, 22, 23 may be one of a waveguide type, which is capable of controlling the modulation amount depending on an applied voltage or applied electric field. An example of the waveguide-type phase modulator is an LN phase modulator. Further, the polarization controller 12 may be one having the plurality of phase modulators 21, 22, 23 for each wavelength component of optical wavelength multiplexing signals. Since there thus exists the polarization controller 12 for each wavelength component, it is possible to control the polarization plane for each of the wavelength components included in a single light beam. Since the wavelength selective polarization controller of the present invention carries out control of the polarization plane with respect to a single light beam, it is possible to control the polarization plane of each wavelength component without causing the timing from one wavelength to another to lag.

An example of the plurality of phase modulators 21, 22, 23 is one having a first phase modulator of 0 degree, a second phase modulator of 45 degrees and a third phase modulator of 0 degree in this order. The phase modulator of 0 degree means a phase modulator in which the phase shift is variable in the range from 0 degree to 360 degrees in the x-axis orientation and the y-axis orientation. The phase modulator of 45 degrees means a phase modulator in which the phase shift is variable in the range from 0 degree to 360 degrees in the orientations of 45 degrees and 135 degrees with respect to the x axis. The phase modulator is well known, and well-known phase modulators can be appropriately used.

Figure 2:
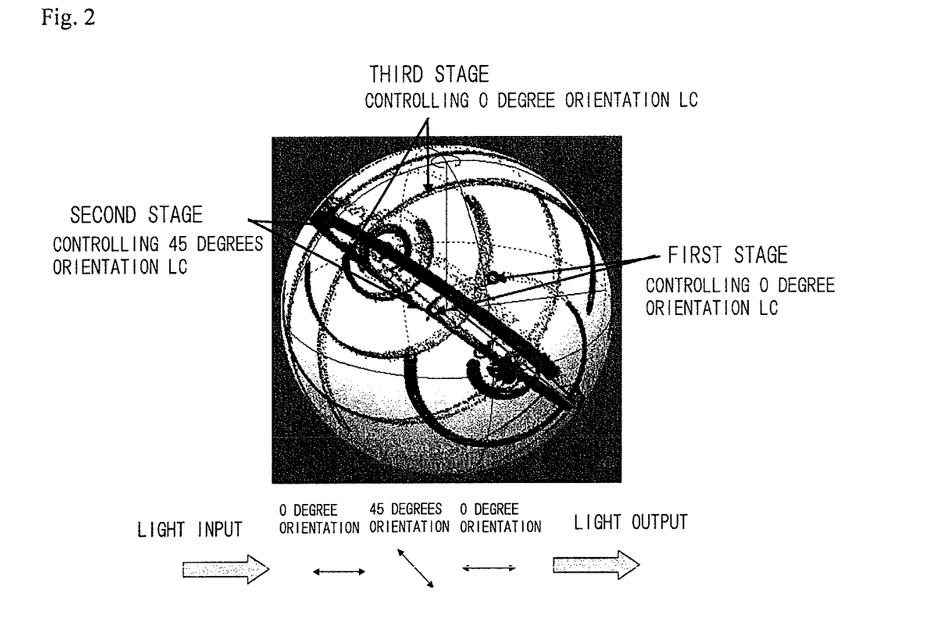
FIG. 2 is a conceptual diagram of polarization control by means of phase modulators of 0 degree, 45 degrees and 0 degree.

FIG. 2 is a conceptual diagram of polarization control by means of phase modulators of 0 degree, 45 degrees and 0 degree. In the above example, the orientations of liquid crystal LC are aligned in the order of 0 degree, 45 degrees and 0 degree.

Among them, by using the phase modulator of 0 degree and phase modulator of 45 degrees, the polarization plane of linear polarized light can be controlled. By returning a light beam to the fiber in a state in which the polarization plane has been controlled like this, wavelength multiplexing signals of the linear polarized light can be obtained. In addition, the wavelength selective polarization controller of the present invention is capable of rendering the linear polarized light to be in an arbitrary polarization state by using the phase modulator after having controlled the polarization plane thereof. As described above, the plurality of phase modulators 21, 22, 23 may be ones having a first phase modulator of 90 degrees, a second phase modulator of 135 degrees and a third phase modulator of 90 degrees in this order. That is, the phase modulator of 90 degrees may be used instead of the phase modulator of 0 degree. Likewise, the phase modulator of 135 degrees may be used instead of the phase modulator of 45 degrees.

Moreover, by using a control amount of the phase modulator, it is possible to obtain the polarization state of each of the incident wavelength components. The wavelength selective polarization controller of the present invention thereby functions also as a monitor of polarization states. Specifically, the wavelength selective polarization controller has a control device such as a computer or the like. The control device is connected to the respective phase modulators. The control device receives information as to control amounts from the phase modulators, and stores them in a storage portion. The control device reads out the information as to control amounts from the storage portion, and carries out computation for obtaining the polarization amounts in the computation portion, in response to the directions of a control program stored in the main memory. The control device outputs the computation results to an output portion such as a monitor or the like, besides storing them in the storage portion as appropriate. The wavelength selective polarization controller of the present invention thus functions also as a monitor of polarization states.

Figure 3:
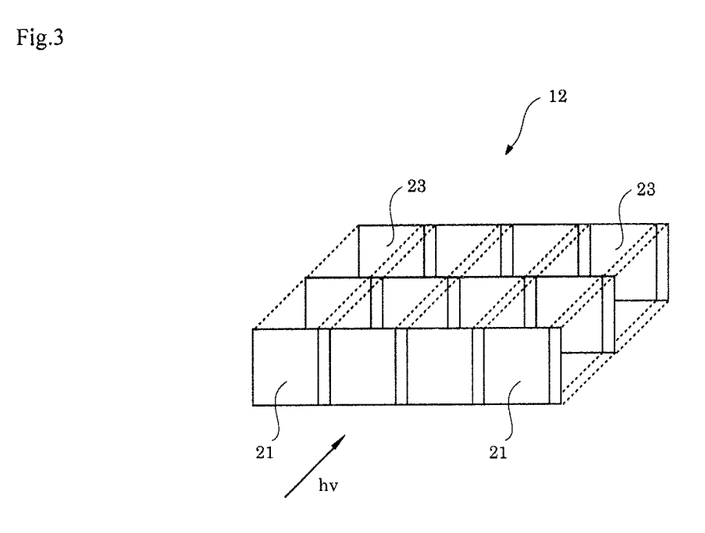
FIG. 3 is a view showing an example of liquid crystal cells constituting a polarization controller.

FIG. 3 is a view showing an example of liquid crystal cells constituting a polarization controller. As shown in FIG. 3, the polarization controller 12 may be one having a plurality of liquid crystal cells formed in a line shape or a matrix shape. The liquid crystal cells are each provided, for example, not only a liquid crystal substance but also electrodes existing so as to interpose the liquid crystal substance therebetween. Incidentally, the electrode may be a transparent electrode or a metal electrode existing at any location in a periphery of the cell. As a specific constitution, for example, three pieces of a liquid crystal element having a lattice pitch of 10 μm to 40 μm are joined together, and the joined one is only mounted on a glass substrate. Incidentally, the above lattice pitch becomes a factor of determining the width of the cell. It is noted that there may be provided a gap in between the adjoining liquid crystal cells.

Among the above liquid crystal cells, it is favorable that one located on the side of a condenser has a convergence diameter small as much as possible because the width of an obtained band path becomes small. From the viewpoint, one having the convergence diameter of the range from equal to or more than 20 μm to equal to or less than 80 μm is named as the convergence diameter, and one having the range from equal to or more than 30 μm to 70 μm is favorably named. Likewise, as the size of the liquid crystal cell, the range from equal to or more than 10 μm to equal to or less than 40 μm is named, and the range is favorably equal to or more than 15 μm to equal to or less than 30 μm, or may be equal to or more than 15 μm to equal to or less than 25 μm. Since minute cells are thus used, a passband of, for example, 10 GHz interval can be attained. Moreover, since the convergence diameter becomes larger as the wavelength becomes larger, two liquid crystal cells may receive single light on the short wavelength side, and three liquid crystal cells may receive single light on the long wavelength side. Incidentally, the convergence diameter is a diameter of the light obtained by image-forming the plural light converged by the condenser on the liquid crystal cell.

The telecentric optical system 11 has a second condenser 31 to which output light from the polarization controller 12 is incident, and a second diffraction grating 32 to which the output light having passed through the second condenser 31 is incident. As the condenser 31 and diffraction grating 32, ones similar with ones described above can be used. Moreover, in the case in which the wavelength selective polarization controller has a reflector, the first condenser and first diffraction grating can be used as the second condenser and second diffraction grating, respectively. As the output optical system 13, there are named, for example, one having a configuration symmetric with the telecentric optical system 11 and, in the case in which light beams return by being reflected, the telecentric optical system 11 itself. In this case, it is only required that a well-known reflector or mirror should exit. Then, by returning the light beams to an optical path after the polarization plane thereof has been controlled, it is possible to output the light beams as an optical wavelength multiplexing signal.

Embodiment 1

Figure 4:
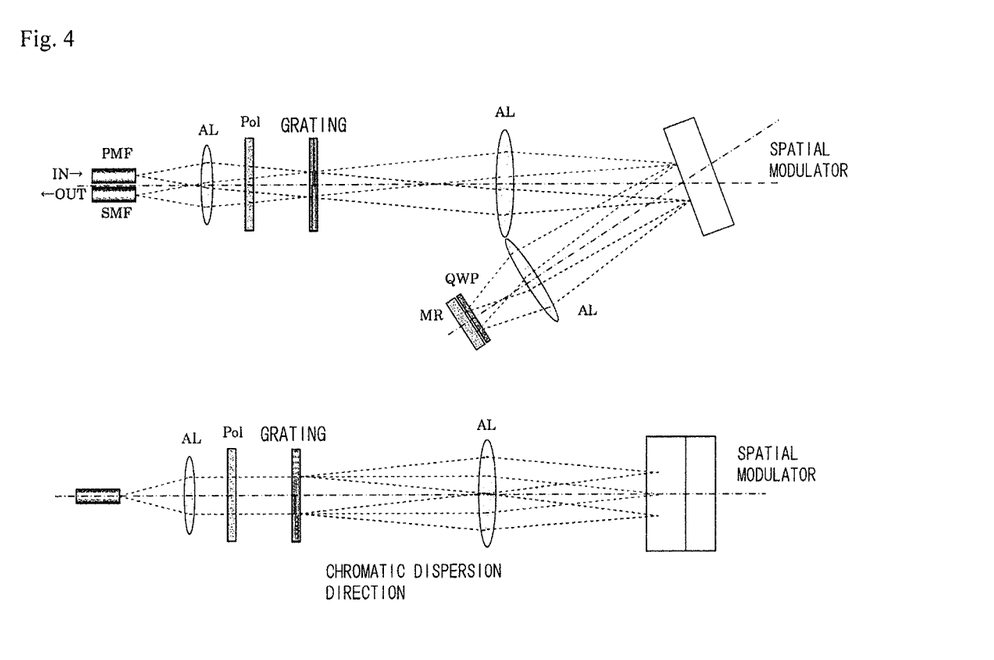
FIG. 4 is a conceptual diagram showing a wavelength selective polarization controller of Embodiment 1.

FIG. 4 is a conceptual diagram showing a wavelength selective polarization controller of Embodiment 1. In FIG. 4, IN denotes an incident wavelength multiplexing signal. PMF denotes a polarization maintaining fiber. AL denotes a condenser. Pol denotes a polarization plane control device. GRATING denotes a diffraction grating. SPATIAL MODULATOR denotes a polarization controller. QWP denotes a quarter wavelength plate. MR denotes a mirror. SMF denotes a single-mode fiber, and OUT denotes an output signal.

Light output from the PMF is incident to a position offset from the center of a condenser. Then, this light propagates diagonally as collimated light. The diagonally propagated light passes through a diffraction grating and is incident to another condenser. The light condensed by the condenser is incident to a polarization control device. The light subjected to control of the polarization plane in the polarization control device is incident to a condenser. The light exited from the condenser propagates via a quarter wavelength plate and a mirror as collimated light, and the polarization plane then rotates 45 degrees. After that, the light of which the polarization plane has been rotated is incident to a polarization control device again and, after propagated via a symmetric optical path, is output from the SMF.

Embodiment 2

Figure 5:
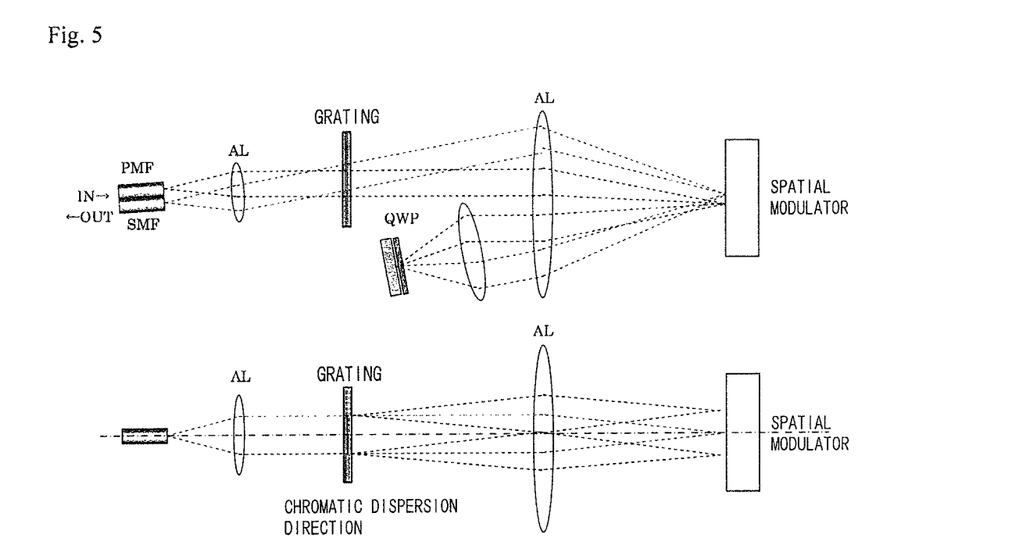
FIG. 5 is a conceptual diagram showing a wavelength selective polarization controller of Embodiment 2.

FIG. 5 is a conceptual diagram showing a wavelength selective polarization controller of Embodiment 2. Even in the mode as shown in FIG. 5, it is also possible to provide a similar wavelength selective polarization controller as with Embodiment 1.

Embodiment 3

Figure 6:
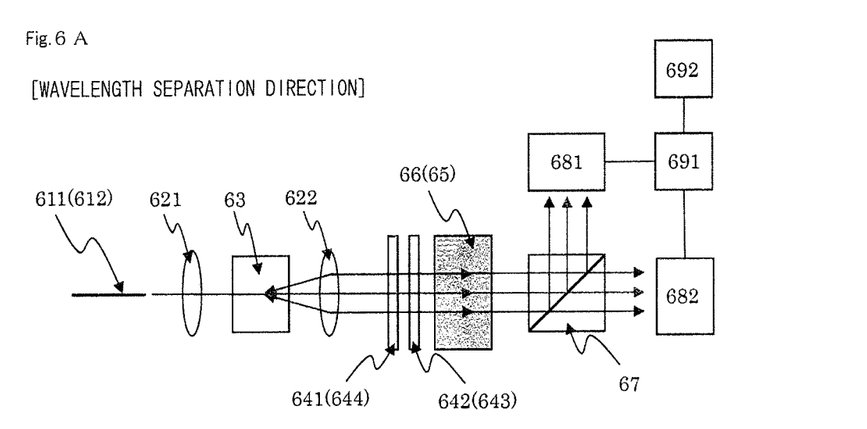
FIGS. 6A and 6B are views each showing a wavelength selective polarization controller, using a polarization-independent wavelength dispersion element, of Embodiment 3 of the present invention, FIG. 6A being a view seen from the direction from which wavelength separation is comprehended, FIG. 6B being a view seen from the direction orthogonal to FIG. 6A.

FIGS. 6A and 6B are views each showing a wavelength selective polarization controller, using a polarization-independent wavelength dispersion element, of Embodiment 3 of the present invention, FIG. 6A being a view seen from the direction from which wavelength separation is comprehended, FIG. 6B being a view seen from the direction orthogonal to FIG. 6A. In the drawings, reference numeral 611 denotes an optical input fiber, reference numeral 612 denotes an optical output fiber, reference numeral 621 denotes a collimator lens, reference numeral 622 denotes a condenser, reference numeral 63 denotes a wavelength dispersion element, reference numerals 641, 644 denotes a 0°-orientation axis liquid crystal cell, reference numerals 642, 643 denotes a 45°-orientation axis liquid crystal cell, reference numeral 65 denotes a beam splitter, reference numeral 66 denotes a total reflection mirror, reference numeral 67 denotes a polarization separation element, reference numerals 681, 682 denotes a light receiving element, reference numeral 691 denotes an A/D converter, and reference numeral 692 denotes an arithmetic processing circuit. Although not shown in the drawing, in addition to this, the wavelength selective polarization controller includes a memory function of storing data, and a computer for determining and controlling the operation of liquid crystal cells on the basis of data of the arithmetic processing circuit. The operation of this embodiment will be described below.

Optical wavelength multiplexing signal light input from a fiber 611 is collimated at the lens 621, and is subjected to a change in the angle depending on the respective wavelengths by being input to the wavelength dispersion element 63 to be input to the lens 622. The fiber 611, fiber 612, lens 621 and lens 622 are rendered to be a telecentric optical system on both sides, and main light beams are condensed by the lens 622 from one wavelength to another in the state of being parallel to the optical axis. The condensed signal light is input to liquid crystals 641 and 642. In the liquid crystals 641 and 642, there are arranged the cells of a number equal to or more than the number of wavelengths of the signal light in the wavelength separation direction, and the input liquid crystal cells are different from one wavelength to another. The signal light having passed through the liquid crystal 642 is input to the beam splitter 65, and the one part passes therethrough, while the other part is reflected there.

First, there will be described as to the passed-through signal light (hereinafter, called as "monitor light"). The monitor light is separated into P-polarized light and S-polarized light components by a polarization separation element. The separated polarized light components are input to the light receiving elements 681 and 682, respectively. In the light receiving elements 681 and 682, there are arranged the light receiving elements of a number equal to or more than the number of wavelengths of the signal light in the wavelength separation direction, and it is possible to obtain light intensity of each polarized light component of the monitor light from one wavelength to another. The light intensities obtained by the light receiving elements 681 and 682 are digitized by an A/D converter, and are subjected to comparison calculation in the arithmetic processing circuit 692, which has a function of comparing them. Incidentally, although not shown in the drawing, the monitor light is usually input to the light receiving elements 681 and 682 by relaying with an appropriate lens system. It is possible to control all monitor light of each wavelength to linear polarized light by controlling the phase amounts of liquid crystals 641 and 642 such that the light receiving intensity at the light receiving element 681 (or 682) becomes to be maximum and the light receiving intensity at the light receiving element 682 (or 681) becomes to be 0, and, as the result, it becomes possible to control the signal light to the linear polarized light on the output side of the liquid crystal 642. At this time, it is possible to calculate the polarization state of each wavelength of the signal light from the values of phase control amounts of the liquid crystals 641 and 642 using the Jones matrix method.

On the other hand, the signal light having been reflected at the beam splitter 66 has been controlled to the linear polarized light as described above, and is reflected in the state of the linear polarized light at the total reflection mirror 66. The signal light is input to liquid crystals 644 and 643 in the state of the linear polarized light. In the liquid crystals 643 and 644, there are arranged the cells of a number equal to or more than the number of wavelengths of the signal light in the wavelength separation direction, the input liquid crystal cells are different from one wavelength to another. Since the signal light is input at the linear polarized light of 45°, 0° relatively with respect to the orientation axis of each of the liquid crystals, it is possible to control the signal light to an arbitrary polarization state from one wavelength to another by individually controlling the phase amounts of the liquid crystals 643 and 644. The signal light having been subjected to polarization control is collimated by the lens 622 to be incident to the wavelength dispersion element, and the respective wavelengths having been separated are remultiplexed. The signal light that has been subjected to polarization control from one wavelength to another and has been remultiplexed is condensed by the lens 621 and is output through the fiber 612.

In this embodiment, although the configuration using the polarization separation element and light receiving elements is presented as a configuration of the monitor of the polarization state of signal light, it may be possible to substitute a different optical system capable of measuring the polarization state. Although not specifically presented because of being well known, it is possible to use a common Stokes parameter measurement optical system constituted of a beam splitter, polarization separation element, fixed phase difference element, analyzer, light receiving element, A/D converter and arithmetic processing circuit.

Embodiment 4

Figure 7A:
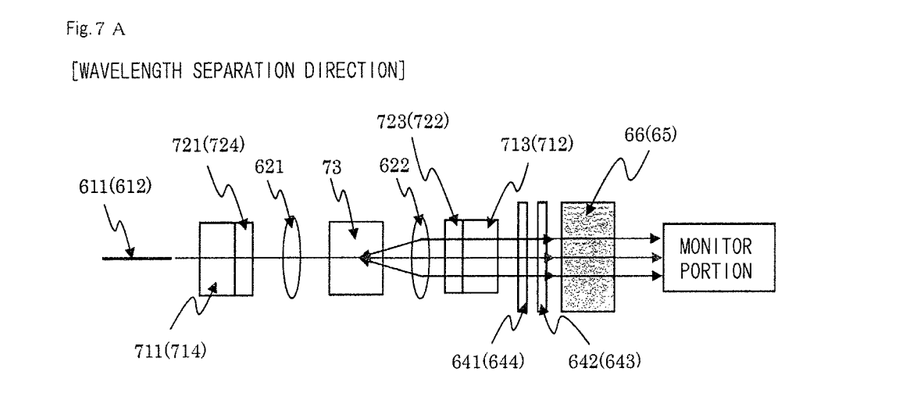
FIGS. 7A and 7B are views each showing a wavelength selective polarization controller, using a polarization-dependent wavelength dispersion element, of Embodiment 4 of the present invention, FIG. 7A being a view seen from the direction from which wavelength separation is comprehended, FIG. 7B being a view seen from the direction orthogonal to FIG. 7A.
Figure 7B:
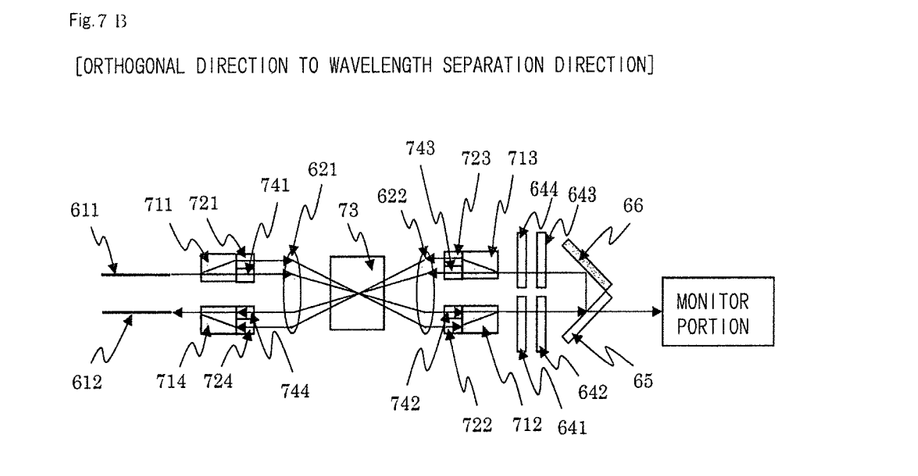

FIGS. 7A and 7B are views each showing a wavelength selective polarization controller, using a polarization-dependent wavelength dispersion element, of Embodiment 4 of the present invention, FIG. 7A being a view seen from the direction from which wavelength separation is comprehended, FIG. 7B being a view seen from the direction orthogonal to FIG. 7A. In the drawings, reference numerals 661 to 66 are as with described above, but the wavelength dispersion element 63 is rendered to have polarization dependence prominently. Reference numerals 711 to 714 each denote a polarization separation element, reference numerals 721 to 724 each denote a half wavelength plate, reference numeral 73 denotes a polarization dependence wavelength dispersion element, and reference numerals 741 to 744 each denote an optical path length correction plate having the same optical path length as that of each of wavelength plates 721 to 724. Although not specifically shown in the drawing, the wavelength selective polarization controller also has the monitor portion constituted of reference numerals 67 to 692 in FIG. 6A.

Optical wavelength multiplexing signal light input from the fiber 611 is separated into a P-polarized light component and an S-polarization component by the polarization separation element 711. The polarized light on one side passes through the correction plate 741 and is input to the lens 621 without being treated. The polarized light on the other side is input to the wavelength plate 721 the optical axis of which is inclined by 45° with respect to input polarized light, and the polarization plane thereof is turned by 90°, that is, it is rendered to be the same polarized light as the polarized light on one side and is input to the lens 621. The two beams of signal light, which have had an identical polarization plane, change the angle depending on the respective wavelengths by being collimated at the lens 621 and being input to the wavelength dispersion element 73, and is input to the lens 622 to be condensed. One beam of the signal light passes through the correction plate 742 and is input to the polarization separation element 712. The other beam of the signal light is input to the wavelength plate 722 the optical axis of which is inclined by 45° with respect to the input polarized light, and the polarization plane thereof is turned by 90°, that is, it is rendered to be polarized light orthogonal to the polarized light on one side and is input to the polarization separation element 712. As the result, the signal light having been separated into two beams by the polarization separation element 712 is polarization-multiplexed to be output. The condensed signal light is input to the liquid crystals 641 and 642. In the liquid crystals 641 and 642, there are arranged the cells of a number equal to or more than the number of wavelengths of the signal light in the wavelength separation direction, and the input liquid crystal cells are different from one wavelength to another. The signal light having passed through the liquid crystal 642 is input to the beam splitter 65, and the one part passes therethrough, while the other part is reflected there. Thereafter, by implementing the same operation as with Embodiment 3 up to the liquid crystal 643, it is possible to control the signal light to an arbitrary polarization state from one wavelength to another on the output side of the liquid crystal 643. The signal light having been subjected to polarization control is separated into a P-polarized light component and an S-polarization component by the polarization separation element 713. The polarized light on one side passes through the correction plate 743 and is input to the lens 622. The polarized light on the other side is input to the wavelength plate 723 the optical axis of which is inclined by 45° with respect to the input polarized light, and the polarization plane thereof is turned by 90°, that is, it is rendered to be the same polarized light as the polarized light on one side and is input to the lens 622. The two beams of signal light having been subjected to polarization control and separated are wavelength-multiplexed by being collimated by the lens 622 and being input to the wavelength dispersion element 73. The signal light on one side having been wavelength-multiplexed is condensed by the lens 621 and passes through the correction plate 744 to be input to the polarization separation element 714. The signal light on the other side is condensed by the lens 621, and, by being input to the wavelength plate 724 the optical axis of which is inclined by 45° with respect to the input polarized light, the polarization plane thereof is turned by 90° to be input to the polarization separation element 714. Consequently, the two beams of signal light having been subjected to polarization control are polarization-multiplexed at the polarization separation element 714, and the signal light having been subjected to polarization control from one wavelength to another becomes one beam to be output from the fiber 612.

INDUSTRIAL APPLICABILITY

The present invention can be utilized in the field of optical information communication.

REFERENCE SIGNS LIST

11: Telecentric optical system
12: Polarization controller
13: Output optical system
15: First diffraction grating
16: First condenser
21, 22, 23: Phase modulator
31: Second condenser
32: Second diffraction grating
611: Optical input fiber
612: Optical output fiber
621: Collimator lens
622: Condenser
63: Polarization-independent wavelength dispersion element
641, 644: 0°-orientation axis liquid crystal
642, 643: 45°-orientation axis liquid crystal
65: Beam splitter
66: Total reflection mirror
67: Polarization separation element
681, 682: Light receiving element
691: A/D converter
692: Arithmetic processing circuit
711, 712, 713, 714: Polarization separation element
721, 722, 723, 724: Half wavelength plate
73: Polarization dependence wavelength dispersion element
741, 742, 743, 744: Optical path length correction plate

The invention claimed is:

1. A wavelength selective polarization controller comprising:
   a telecentric optical system to which optical wavelength multiplexing signals are incident;
   a polarization controller that controls a polarization plane of light having been output from the telecentric optical system; and
   an output optical system for outputting an output from the polarization controller to an optical path,
   wherein the telecentric optical system includes
   a first diffraction grating to which optical wavelength multiplexing signals are incident, and
   a first condenser that condenses the optical wavelength multiplexing signals having passed through the diffraction grating, and transmits the optical wavelength multiplexing signals to the polarization controller in a state of being aligned from one wavelength to another in a single light beam,
   the polarization controller includes
   a plurality of phase modulators and controls polarization planes of the optical wavelength multiplexing signals, which are output from the telecentric optical system, for each wavelength component, and
   the output optical system includes
   a second condenser to which output light from the polarization controller is incident, and
   a second diffraction grating to which output light having passed through the second condenser is incident.

2. The wavelength selective polarization controller according to claim 1, wherein the plurality of phase modulators have a first phase modulator of 0 degree, a second phase modulator of 45 degrees and a third phase modulator of 0 degree in this order.

3. The wavelength selective polarization controller according to claim 1, wherein the plurality of phase modulators have a first phase modulator of 90 degrees, a second phase modulator of 135 degrees and a third phase modulator of 90 degrees in this order.

* * * * *